Feb. 18, 1930.  L. R. SUTHERLAND  1,747,268
CONNECTER FOR TERMINALS
Filed May 14, 1925
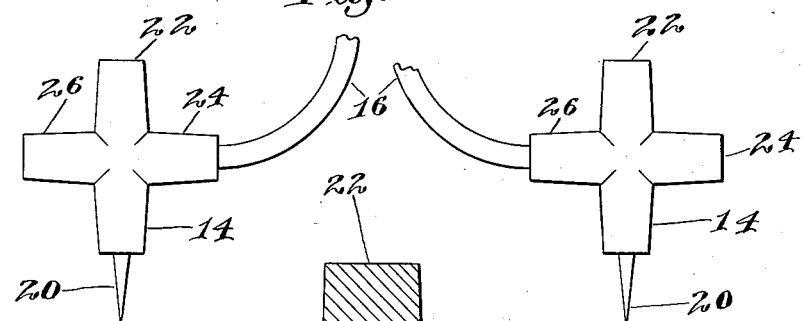
Fig. 1.
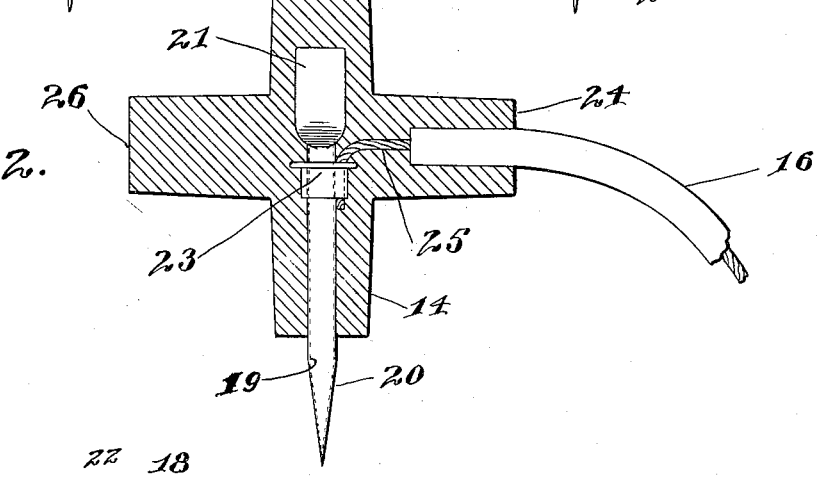
Fig. 2.
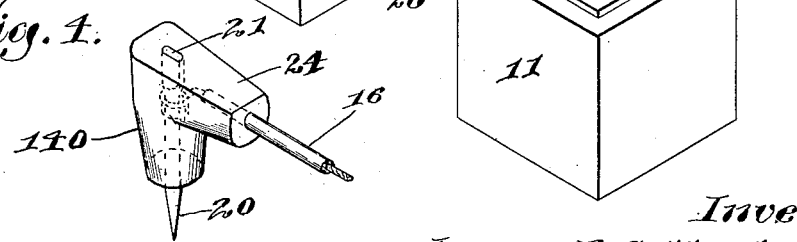
Fig. 3.
Fig. 4.
Inventor
Lorne R. Sutherland
by Mitchell, Chadwick & Kent
Attorneys Patented Feb. 18, 1930

1,747,268

UNITED STATES PATENT OFFICE

LORNE R. SUTHERLAND, OF BROOKLINE, MASSACHUSETTS, ASSIGNOR TO BURTON & ROGERS MANUFACTURING COMPANY, OF BOSTON, MASSACHUSETTS, A CORPORATION OF MASSACHUSETTS

CONNECTER FOR TERMINALS

Application filed May 14, 1925. Serial No. 30,250.

This invention relates to improvements in connecters for terminals. More particularly it relates to means for making and releasing good and uniform electrical connection, between two terminals which are located near together; and it is especially adapted for thus connecting in series storage batteries which are being recharged, as at custom charging stations or elsewhere where a considerable number of separate batteries are associated on one line for a single charging current to go through them all. In such cases it is desired to add and remove batteries easily, with as little resistance as is reasonably possible at the connection, and with certainty that the losses at such points will be constant and uniform.

Batteries used in automobiles, which may be taken as illustrative, ordinarily have three two-volt cells housed in a box and are provided with stout lead posts which constitute the terminals at diagonally opposite corners. A battery which is to be charged is taken from its automobile after disconnection of stout clamps which embrace these lead posts, and is set on the charging stand in series with other batteries that are being charged by the same current, where it has to remain for a day or two subject to a current of prescribed character. For connecting these batteries temporarily in series the flexible conductors having terminal spring clips are much used; but acid from the batteries gets up around them, chemical reactions, deposits and coatings arise, the resistance becomes uncertain, and the clips have a tendency to become corroded and to break. In consequence also, the charging current becomes subject to uncertain and uncontrollable variations due to the uncertain engagement of the clips in the coatings, especially if a battery is added to or taken from the circuit.

The device of the invention provides for electrical connections of certainty and constancy, of low resistance electrically, notwithstanding the presence of chemical deposits on the battery terminals, and of permanent resistance chemically, so far as the effect of sulfuric acid on the connecter is concerned. And it provides these connections in such manner that they can be easily and quickly made, and easily and quickly broken.

The objects of the invention are accomplished by providing a sharp steel drive pin, capable of penetrating the lead post of the battery terminal, and housing it in lead in such manner that mechanically and electrically and chemically the said functions are performed. This lead also constitutes means augmenting the size and so changing the size and shape of the article, from pin shape and size, that it can easily be manipulated by hand or by tool for insertion and removal. Meanwhile the point of the pin is housed in a thin layer of lead, as by electroplating the lead upon it, without the size of that portion of the pin being materially increased. In its preferred form this portion of the connecter has the aspect of a stout cross of lead with a steel point projecting down from the upright into the battery terminal and with a rubber tube (containing a flexible conductor) extending from a lateral arm to a similar cross for the other terminal connection. Each sharp point can easily be manipulated and held by means of the stout arms of the cross, for being driven by a hammer into the lead body of the terminal post of a battery that is to be connected; it can thus be driven in so firmly that it will not come out readily when a direct upward pull is applied; and yet for disconnection it can be removed with great ease by one who grasps it by one or both arms of the cross and gives it a slight twist before pulling it. The strength and stiffness of the steel, which may be heat treated, give the necessary penetrating power; the deformation of a part of this round pin into flatness in the plane of its axis and the intimate flowing of the molten lead around the non-circular part before solidifying make a mechanical connection which is intimate and strong, so that the fingers of a person grasping the cross or one arm of it can turn the pin, notwithstanding that its point portion is rigidly imbedded in the battery terminal; the upward extension of the upright on the axis of the pin provides a broad and convenient anvil or head for the hammer which is to drive the pin; one of the lateral arms of the cross affords a thick protecting housing and seal for the end of the rubber insulator; and the intimately-penetrating all-enveloping characteristic of the molten lead makes a secure electrical connection between the flexible wire and the pin without the need of a substantial mechanical connection being made in advance. In the process of manufacture, these parts may be merely loosely put together, by sticking both the pin and the ends of the wire through a small ring, which holds them until the molten lead cast about them cools and holds them permanently.

It will be understood that the invention may be applied in ways other than that here chosen for illustration. It is intended that the patent shall cover, by suitable expression in the appended claims, whatever features of patentable novelty exist in the invention disclosed.

In the accompanying drawings:

Figure 1 is a side view of the complete connecter, with the middle portion of its flexible conductor removed;

Figure 2 is an elevation in section on the axes of the pin and of the conductor;

Figure 3 is an isometric view showing the connecter in use; and

Figure 4 is a similar view of another form, making a saving of material without substantial change of function.

Referring to the drawing, 10 indicates a storage battery of the size and type commonly used in automobiles at the present day, comprising three cells; and 11 is a similar battery. The connecter of the invention, shown in use between these two batteries, comprises the steel pins 20 each of which projects from the under side of a lead body which in Figs. 1–3 has the shape of a small stout rectangular cross 14, is driven into a lead terminal 18 of the battery. The pin is connected to the other pin 20 by the flexible conductor 16. The conductor 16 may be of any convenient and suitable material. In the case assumed for illustration, No. 14 stranded copper wire encased in rubber has been found satisfactory. The pin 20 is of steel, heat treated so as to be stiff but not brittle, for which purpose the quality known as "tack hardness" is suitable. This pin is preferably a piece of round rod which at one end has been ground tapering to a point and at its other end 21 has been deformed from circularity, preferably by being flattened in the plane of its axis, as is indicated in Figure 2 and as is seen in Figure 4; and then coated with lead or lead composition, as for example, by an electroplating process. The non-circularity is easily produced by a hammer blow or by a die and press. In assembling the pin with the conductor 16, the shank of the pin is passed through a small metallic ring 23 comparable in size and character to an eyelet such as is used in shoes. Preferably it will be a continuous band of stamped sheet metal. The bared end 25 of the copper conductor is bent and hooked through the same eyelet, which thus loosely holds together the pin and the copper conductor. The upper two-thirds part of the pin 20 and the adjacent part of the conductor 16, including a portion of the insulation of the latter, are then placed in a suitable mold and a molten composition is poured so as to flow all about these parts, and to produce the upstanding head 22 and the laterally extending cross arms 24, 26. The composition preferred is mainly lead, with some antimony or other elements, so that it will resist sulfuric acid and will have sufficient stiffness to transmit hammer blows to the upper part of the drive pin of steel capable of driving that point into lead. However, other material which would serve these purposes might be substituted. The requirement for transmitting hammer blows can be eliminated by the form shown in Figure 4, where the top 21 of the steel pin is exposed. The lead thus cast embraces the greater portion of the pin and is engaged with it non-rotatively because of the flattening of the head of the pin on the axis of the pin, and also is engaged with it for pin-driving effectiveness both over the top of the head of the pin and over the considerable additional sloping surface at the end of the flattened portion. The cross thus holds the pin very securely; and the stout lateral arms of the cross are large enough for the fingers of the person using it to manipulate the cross, and thus to manipulate the small steel pin with a sure and strong grip, and with sufficient strength to loosen it from its driven-fast position in the terminal of the battery. The plating of lead or composition on the steel point, and the thick covering of lead and of rubber elsewhere on the steel and the copper prevent any trouble rising from the inevitable presence of the sulfuric acid. The conductor wires become permanently hooked within the little ring in the middle of the cross, and the lead prevents the straightening of the hook by any ordinary force to which the apparatus is subject when in use. Thus the invention produces a connecter which is both secure in its connection, easily removable by hand, and which is fitted to endure through a long period of usefulness. The removability by twisting and straight pulling on the cross arms eliminates the danger of breaking the pin in extracting it.

The form shown in Figure 4 requires less material and yet retains the principal features of the invention. The turning of the pin on its own axis for loosening it can be effected by grasping one of the cross arms which is retained, both not being needed; and the pin can be held for its initial driving by this same means. The mass 22 of lead provided in Figure 2 above the top 21 of the pin can be omitted without seriously exposing the pin whose top is represented in Figure 4 as being flush with the top of the lead which encases the body and remainder of the head of the pin. In this case the hammer blows for making a connection may fall directly upon the head of the pin 20. The coating of lead plated thereon affords it initial protection from acid; and even if this lead were hammered away in use, the surface of steel exposed to sulphuric acid action would be so slight that the corrosion would not be serious. The shape of the exterior of the lead masses is in general immaterial, these masses being round in cross section in Figures 1–3, and flat topped in Figure 4. It will be observed that in both cases the closeness with which the body of lead 14 and 140 embraces and encases the greater part of the length of the pin strongly reinforces the slender column of the pin and makes it secure against medial deflection when struck endwise by a hammer.

I claim:

1. A device for connecting a conductor to a lead terminal, comprising a pin, adapted to be driven into said terminal; said pin having a part of its shaft flattened toward its axis; and an eyelet strung on said shaft; the end portion of said conductor being loosely hooked into the eyelet on the pin; and a mass of lead making all rigid together, being cast around all, except that the pin point protrudes therefrom.

2. A device for connecting a conductor to a lead terminal, comprising a pin with point adapted to penetrate the lead, said pin being itself cast in a body of stiff material, resistant to acid, and having a combined non-rotatory and driving engagement with said material comprising an intermeshing of said material with an axially flattened portion of the shaft of the pin; a flanged ring encircling the pin loosely within said cast material; and the end portion of the conductor entering said mass laterally, bent into parallelism with said pin, and hooked into the ring next to its flange; the pin having its point protruding from said cast body.

3. A device for connecting a conductor to a lead terminal, comprising the combination with said conductor of a pin adapted to be driven into said terminal; a ring strung on the pin and having the end portion of said conductor hooked therein; and a mass of lead cast around the pin, ring and conductor end, making them rigid together, with the pin point protruding.

4. A device for connecting a conductor to a lead terminal, comprising the combination with said conductor of a pin adapted to be driven into said terminal; an endless ring of stamped sheet metal of larger diameter loosely strung on the pin and having the end portion of said conductor hooked therein; and a mass of lead cast around the pin, ring and conductor end, filling the said looseness making them rigid together, with the pin point protruding.

Signed at Boston, Massachusetts, this thirteenth day of May, 1925.

LORNE R. SUTHERLAND.